UNITED STATES PATENT OFFICE.

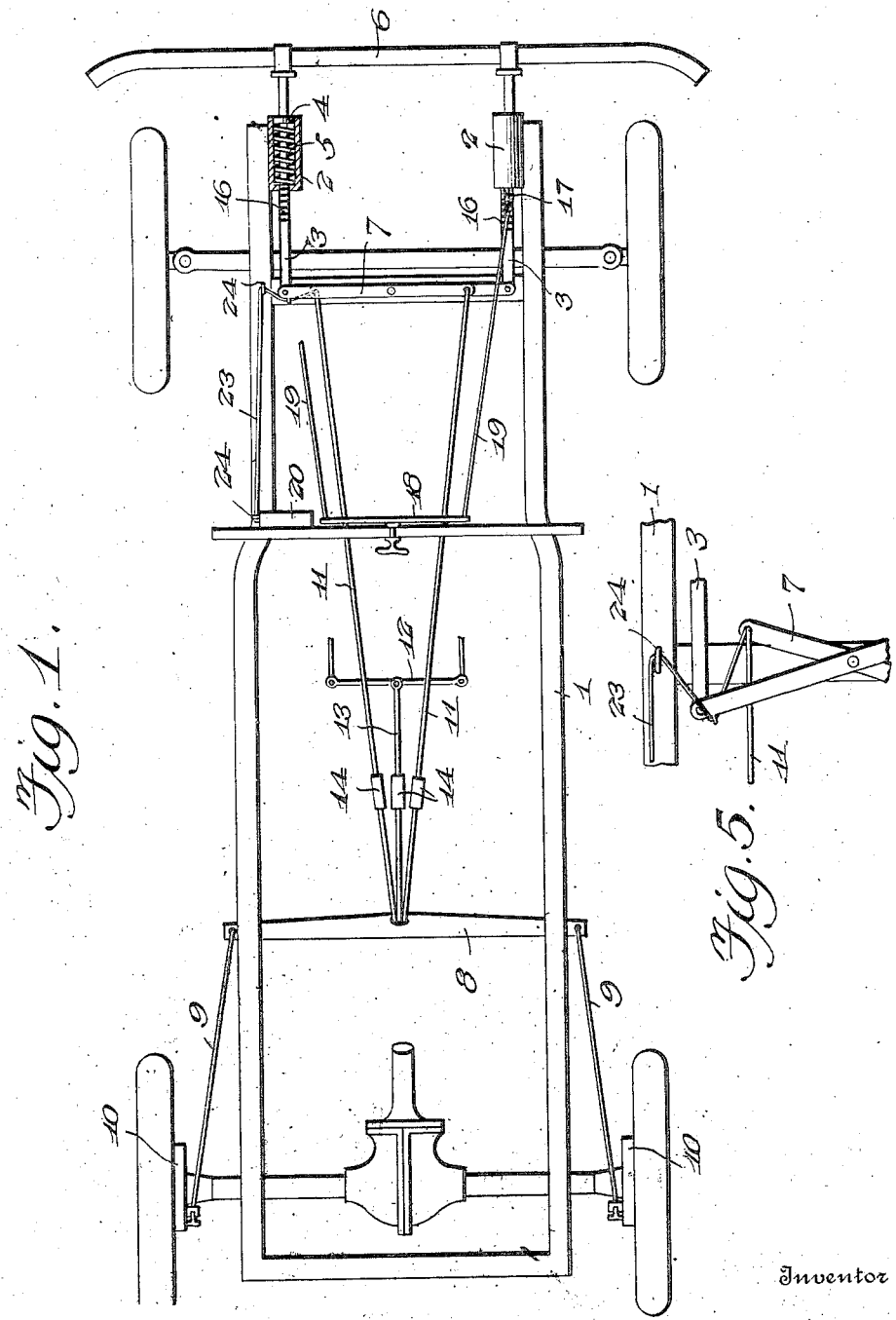

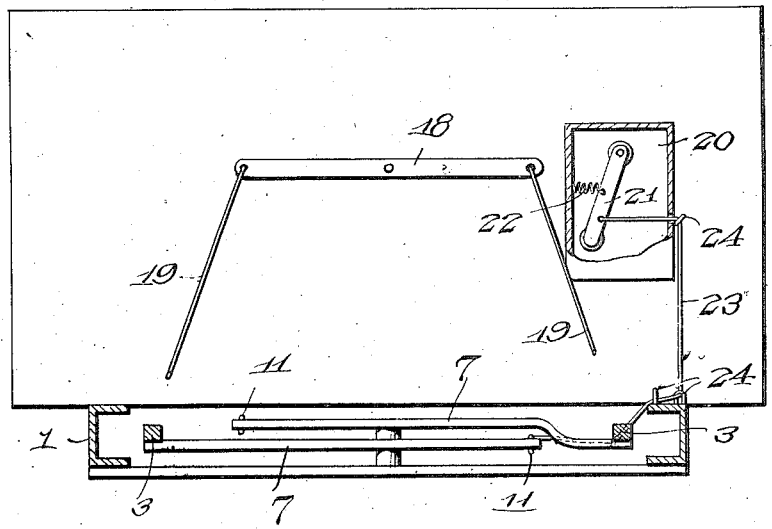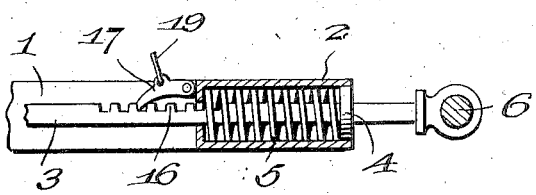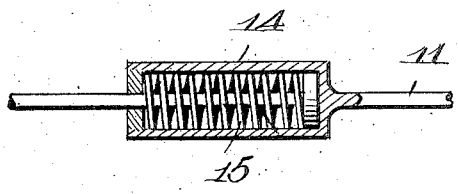

CLYDE I. WELCH, OF GROTON, VERMONT.

AUTOMATIC BRAKE.

1,197,417.

Specification of Letters Patent.

Patented Sept. 5, 1916.

Application filed January 22, 1916. Serial No. 73,728.

*To all whom it may concern:*

Be it known that I, CLYDE I. WELCH, a citizen of the United States, residing at Groton, in the county of Caledonia and State of Vermont, have invented new and useful Improvements in Automatic Brakes, of which the following is a specification.

This invention relates to automatic brakes for motor vehicles and it consists in the novel features hereinafter described and claimed.

An object of the invention is to provide means by which the fender on a power propelled vehicle will operate the brakes when the said fender strikes an obstacle in a manner to apply the brakes thereby bringing the vehicle to a state of rest.

A further object of the invention is to provide means for breaking the electric circuit to the spark plug of the engine of the vehicle when the fender comes in contact with an obstacle while the vehicle is in motion.

In the accompanying drawings:—Figure 1 is a top plan view of the brake mechanism. Fig. 2 is a transverse sectional view of the same; Fig. 3 is a detailed sectional view of a cylinder and adjacent parts used in the mechanism; Fig. 4 is a similar view of a sleeve used in the mechanism; Fig. 5 is an enlarged detailed plan view of parts of the mechanism.

As illustrated in the accompanying drawing, the frame 1 is of the usual form employed for supporting the body and engine of an automobile. Cylinders 2 are mounted at the forward portion of the frame 1 and bars 3 are slidably mounted in the said cylinders. Shoulders 4 are mounted upon the bars 3 and coil springs 5 are housed in the said cylinders and bear at one end against the shoulders 4 and at their other end against the rear ends of the cylinders 2. The springs 5 are under tension with a tendency to hold the shoulders 4 at the forward end portions of the cylinders 2. A fender 6 is mounted upon the forward ends of the bars 3 and the said bars at their rear ends are pivotally connected with the outer ends of levers 7 which are fulcrumed upon the frame 1. A bar 8 is movably mounted at the intermediate portion of the frame 1 and is disposed transversely with relation thereto. Rods 9 are connected with the end portions of the bar 8 and the said rods are also connected with brake mechanisms 10 located at or in the vicinity of the hubs of the rear wheels of the vehicle. Rods 11 are pivotally connected at their forward ends with the inner ends of the levers 7 and are connected at their rear ends with the intermediate portion of the bar 8. A lever 12 is mounted upon the frame 1, or may be mounted upon the body of the vehicle supported upon the said frame and a rod 13 is connected at its forward end with the lever 12 and at its rear end with the intermediate portion of the bar 8. The rods 11 and 13 may be and preferably are longitudinally extensible. That is to say, the said rods may be composed of sections and the said sections may move within prescribed limits with relation to each other. As illustrated in the drawings the means whereby the said sections may move consist of sleeves 14 mounted on one section and which slidably receive the end portions of the connected section. Springs 15 are located in the sleeves 14 and bear at one end against the sleeves and connect at their other ends with the rod sections which are slidably received in the sleeve and are under tension with a tendency to hold the ends of the sections which are inserted in the sleeves toward one end of the sleeves.

Teeth 16 are provided upon the bars 3 and pawls 17 are pivotally mounted on the cylinders 2 and engage the teeth 16 in a manner to permit the teeth to move rearwardly while the pawls are in engagement with the same, but the said pawls prevent the teeth from moving in a forward direction under the influence of the springs 5 when the said pawls are in engagement with the teeth. A lever 18 is fulcrumed upon the dashboard of the machine or any suitable part of the body thereof and rods 19 connect the ends of the lever 18 with the pawls 17. It is apparent that when the lever 18 is swung, the rods 19 may be successively moved longitudinally whereby the pawls 17 may be swung out of engagement with the teeth 16 and thus the bars 3 may be released and are free to move in forward directions under the influence of the springs 5.

A switch 20 is mounted upon the body of the vehicle and includes a pivoted tongue 21 adapted when in one position to close the circuit to the spark plugs of the engine of the vehicle. A spring 22 is connected at one end with the tongue 21 and at its other end with a fixed part of the switch structure and is under tension with a tendency to normally hold the tongue 21 in a position to close the circuit to the spark plugs of the engine. A flexible element 23, as for instance, a cable is connected at one end with the switch 20 and at the other end with one of the levers 7. The intermediate portion of the flexible element 23 is trained through eyes 24 suitably arranged upon the body of the vehicle.

When the vehicle is in motion and should the fender 6 strike an obstacle, the said fender is moved in a rearward direction under the force of impact whereby the bars 3 are moved longitudinally in the cylinders 2 in a rearward direction against the springs 5. As the said bars 3 move rearwardly they swing the levers 7 whereby the inner ends of the said levers are moved in a forward direction and this in turn moves the rods 11 longitudinally whereby the bar 8 is moved in a forward direction and through the rods 9 the brake mechanisms 10 are applied. At the same time one of the levers 7 moves the flexible element 23 longitudinally through the eyes 24 and thus the switch tongue 21 is swung from a closed to an open position with the relation to the circuit of which it forms a part and therefore, the electric circuit to the spark plugs of the engine is interrupted and the engine comes to a state of rest. When the bars 3 move rearwardly as hereinbefore described, the pawls 17 engage the teeth 16 and thus the brake mechanisms 10 are held in applied conditions until the pawls 17 are lifted out of engagement with the teeth 16 by operating the lever 18 as hereinbefore described. If at any time it is desired to manually apply the brake mechanisms the lever 12 is swung whereby the rod 13 is moved longitudinally and the bar 8 together with the connecting rod 9 are moved to apply the brakes 10.

From the above description taken in conjunction with the accompanying drawings, it will be seen that an automatic brake mechanism of simple and durable structure is provided and that means is also provided for holding the brakes applied which means may be easily and quickly manipulated to release the brakes whereby they automatically release the wheels of the vehicle. Furthermore, means is provided in combination with a brake mechanism for interrupting the circuit to the spark plugs of the engine of the vehicle, thus causing the engine to come to a state of rest when the brakes are applied. Also means is provided for manually applying the brakes independently of the same for automatically applying them.

Having described the invention what is claimed is:—

A vehicle brake comprising levers fulcrumed upon the frame of the vehicle, a spring pressed fender movably mounted upon the frame of the vehicle and connected with the levers, means for holding the fender in retracted position, a brake bar mounted upon the frame of the vehicle and operatively connected with the brake mechanisms thereof, longitudinally extensible elements connecting the said brake bar with the levers, a manually operable lever mounted upon the vehicle and a longitudinally extensible element connecting said manually operable lever with the said brake bar.

In testimony whereof I affix my signature in presence of two witnesses.

CLYDE I. WELCH.

Witnesses:
BURNS F. HEATH,
Mrs. EDWARD SMITH.